(12) United States Patent
Liu et al.

(10) Patent No.: US 10,906,721 B2
(45) Date of Patent: Feb. 2, 2021

(54) VACUUM PRESERVATION DEVICE

(71) Applicant: Whirlpool (China) Co., Ltd., Hefei (CN)

(72) Inventors: An Liu, Hefei (CN); Zhicheng Liu, Hefei (CN); TongSheng Tao, Hefei (CN); Huajun Yu, Hefei (CN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/535,768

(22) Filed: Aug. 8, 2019

(65) Prior Publication Data
US 2020/0047973 A1 Feb. 13, 2020

(30) Foreign Application Priority Data

Aug. 8, 2018 (CN) .......................... 2018 1 0893516

(51) Int. Cl.
*B65D 81/20* (2006.01)
*F25D 17/04* (2006.01)
*F25D 25/02* (2006.01)

(52) U.S. Cl.
CPC ....... *B65D 81/2038* (2013.01); *F25D 17/042* (2013.01); *F25D 25/025* (2013.01); *B65D 81/2015* (2013.01); *F25D 2317/043* (2013.01)

(58) Field of Classification Search
CPC ............ B65D 81/2038; B65D 81/2015; F25D 17/042; F25D 25/025; F25D 2317/043; A23L 3/0155
See application file for complete search history.

(56) References Cited

U.S. PATENT DOCUMENTS

| | | | | |
|---|---|---|---|---|
| 4,909,014 A | * | 3/1990 | Kobayashi | A23L 3/0155 53/103 |
| 5,095,717 A | * | 3/1992 | Germi | F25D 17/042 417/313 |
| 5,157,940 A | * | 10/1992 | Bertu | F25D 17/042 62/268 |
| 5,271,240 A | * | 12/1993 | Detrick | F25D 17/042 62/268 |
| 6,090,422 A | * | 7/2000 | Taragan | A23L 3/0155 426/231 |
| 6,120,069 A | * | 9/2000 | Taranto | E05B 83/30 292/166 |

(Continued)

FOREIGN PATENT DOCUMENTS

CH 666666 A5 8/1988
CN 101927872 A 12/2010
(Continued)

*Primary Examiner* — Hanh V Tran
(74) *Attorney, Agent, or Firm* — Price Heneveld LLP

(57) ABSTRACT

The present disclosure relates to a vacuum preservation device, comprising a drawer including a drawer panel at the front end of the drawer, and a handle assembly. The handle assembly is coupled to the drawer panel, wherein the handle assembly includes a door body sealing assembly and a handle. A preservation container body comprises a preservation container body fixing part and a preservation container body sliding part. An electric push rod is coupled to the preservation container body and is coupled to the preservation container body sliding part and to the preservation container body fixing part.

20 Claims, 6 Drawing Sheets

(56) References Cited

U.S. PATENT DOCUMENTS

| | | | | |
|---|---|---|---|---|
| 6,994,227 | B2* | 2/2006 | Kwon | A47J 47/10 116/309 |
| 7,048,311 | B2* | 5/2006 | Sawatani | B60R 7/06 292/32 |
| 8,127,561 | B1* | 3/2012 | Allard | A23L 3/3418 62/62 |
| 9,127,880 | B2* | 9/2015 | Park | F25D 23/003 |
| 9,237,766 | B2* | 1/2016 | Allard | A23L 3/3418 |
| 2002/0083724 | A1* | 7/2002 | Tarlow | F25D 25/025 62/131 |
| 2005/0061370 | A1* | 3/2005 | Higer | B65B 31/025 137/221 |
| 2006/0117763 | A1* | 6/2006 | Espinosa | F25D 29/00 62/78 |
| 2007/0234754 | A1* | 10/2007 | Pimputkar | F25D 17/042 62/441 |
| 2008/0134706 | A1* | 6/2008 | Manzo | F25D 17/042 62/337 |
| 2008/0148765 | A1* | 6/2008 | Barone | F25D 17/06 62/407 |
| 2008/0302441 | A1* | 12/2008 | Kelly | F25D 17/042 141/65 |
| 2009/0194193 | A1* | 8/2009 | Vonderhaar | F25D 17/042 141/65 |
| 2010/0018161 | A1 | 1/2010 | Cai | |
| 2011/0289957 | A1* | 12/2011 | Kim | F25D 17/042 62/404 |
| 2013/0270986 | A1* | 10/2013 | Min | F25D 25/025 312/330.1 |
| 2013/0340465 | A1* | 12/2013 | Park | E05C 3/048 62/376 |
| 2014/0021838 | A1* | 1/2014 | Jung | F25D 23/00 312/236 |
| 2014/0021846 | A1* | 1/2014 | Jung | F25D 17/042 312/404 |
| 2014/0028171 | A1* | 1/2014 | Jung | F25D 23/085 312/404 |
| 2014/0028172 | A1* | 1/2014 | Min | F25D 23/00 312/404 |
| 2014/0075889 | A1* | 3/2014 | Avrech | A23L 3/3418 53/432 |
| 2014/0077679 | A1* | 3/2014 | Lee | E05B 65/0042 312/404 |
| 2014/0284239 | A1* | 9/2014 | Espinosa | B65D 81/2069 206/459.5 |
| 2014/0354133 | A1* | 12/2014 | Park | A47B 88/40 312/404 |
| 2014/0354134 | A1* | 12/2014 | Park | F25D 25/025 312/404 |
| 2015/0368021 | A1* | 12/2015 | Ho | B65D 81/2038 206/524.8 |

FOREIGN PATENT DOCUMENTS

| | | |
|---|---|---|
| CN | 203116405 U | 8/2013 |
| CN | 204043274 U | 12/2014 |
| CN | 108895757 A | 11/2018 |
| DE | 50310190 T2 | 10/2007 |
| EP | 1020371 A2 | 7/2000 |
| JP | 2009255970 A | 11/2009 |
| KR | 20100019845 A | 2/2010 |
| WO | 0171263 A1 | 9/2001 |

* cited by examiner

VACUUM PRESERVATION DEVICE

CROSS-REFERENCE TO FOREIGN PRIORITY APPLICATION

The present application claims priority to Chinese Utility Model Application No. 201810893516.1, filed on Aug. 8, 2018, the disclosure of which is hereby incorporated herein by reference in its entirety.

TECHNICAL FIELD

The present disclosure relates to the technical field of refrigerators, and specifically relates to a vacuum preservation device.

BACKGROUND

Refrigerators are the most common products among household refrigeration products and occupy a significant share of the market. Consumers have increasingly high demands for refrigerators. Refrigerators have more advanced configurations and more powerful functions and may provide a longer shelf life for stored foods. As a result, a variety of preservation products have been developed. Nowadays, a vacuum device is used within the refrigerator to perform preservation, such that foods can be preserved in a vacuum compartment for a longer period of time, which in turn enables a higher degree of freshness. However, the conventional vacuum device needs to use a vacuum pump to perform air pumping so as to enable the vacuum state. The operation process is complex, and the vacuum pump in operation makes severe noise.

SUMMARY

The objective of the present disclosure is to provide a vacuum preservation device. The device can enable a vacuum state without using a vacuum pump and has the features of a simple structure, easy to operate, and may be generally noise free.

In order to achieve the above objective, the present disclosure adopts the following technical solutions.

A vacuum preservation device comprising a drawer assembly and a preservation container body is provided.

Specifically, the drawer assembly comprises a drawer, a drawer panel disposed at a front end of the drawer, and a handle assembly mounted on the drawer panel; a mounting slot is provided on the drawer panel, and a vent hole is provided in the mounting slot; the handle assembly comprises a door body sealing assembly mounted in the mounting slot and a handle connected to the door body sealing assembly; an inner sidewall of the handle is provided with a rubber plug adapted to the vent hole;

The preservation container body comprises a preservation container body fixing part and a preservation container body sliding part connected to each other by electric push rods, and a sealing part either is disposed between the preservation container body fixing part and the preservation container body sliding part or wraps around outer sides of the preservation container body fixing part and the preservation container body sliding part; a front end of the preservation container body fixing part is provided with an opening for the drawer to enter and exit, and the preservation container body fixing part slidably engages with the drawer; a front end of the preservation container body moving part is provided with an opening for the preservation container body fixing part to enter and exit; and a plurality of through holes are provided on a rear wall of the preservation container body fixing part.

Further, the electric push rods are two electric push rods symmetrically disposed on a left side and a right side of the preservation container body fixing part; a left side and a right side of a rear wall of the preservation container body moving part are respectively provided with fixing plates extending outwards; and a rear end of the electric push rod is connected to the fixing plate.

Further, the drawer panel is mounted at the front end of the drawer via a panel fixing frame, a first sealing strip is provided between the drawer panel and the panel fixing frame, and a second sealing strip is provided between the panel fixing frame and a front sidewall of the drawer.

Further, a left side and a right side of the drawer are respectively provided with sliders, and inner walls of a left side and a right side of the preservation container body fixing part are respectively provided with guide rails slidably engaging with the sliders.

Further, the sealing part is a bellows or a sealing strip.

Further, an outer side of the drawer panel is provided with a decorative plate.

Further, each of a left side and a right side of the panel fixing frame is provided with a lock ring; the mounting slot is a T-shaped slot disposed on an outer side surface of the drawer panel, sidewalls of two ends of a horizontal slot body of the T-shaped slot are provided with lock holes matching the lock rings, and a first fixing fastener and a second fixing fastener are mounted in the horizontal slot body of the T-shaped slot.

Further, the door body sealing assembly comprises a rotating shaft rod movably connected to the first fixing fastener and two ejector rods respectively disposed at two ends of the rotating shaft rod; the handle is fixedly mounted on a middle section of the rotating shaft rod via a fixing fastener; the ejector rod is movably connected to the second fixing fastener; the rotating shaft rod comprises a shaft rod, two shaft rod discs respectively disposed at two ends of the shaft rod, and two cams respectively perpendicularly connected to outer sidewalls of the two shaft rod discs; a top of the cam is a horizontal platform, a first side edge of each cam is perpendicular to each of the shaft rod discs, and a second side edge extends obliquely downwards from the top of the cam to the shaft rod disc; the ejector rod comprises a support plate, a support column and a pin connected in sequence to an outer sidewall of the support plate, a spring, sleeved on an outer side of the pin, has an inner end portion connected to the support column, and two columns disposed on an inner sidewall of the support plate; and a distance between the two columns is equal to a distance between the horizontal platforms at the top of the two cams.

Further, the first fixing fastener comprises a first fixing fastener main body mounted in the T-shaped slot, a rotating slot provided on the first fixing fastener main body, and a shaft rod retaining portion disposed on an outer sidewall of the rotating slot; the shaft rod rotatably engages with the rotating slot; the second fixing fastener comprises a pin fixing fastener and a support column fixing fastener sequentially provided thereon and two connecting plates respectively connected to upper ends and lower ends of the pin fixing fastener and the support column fixing fastener; an arc-shaped slot for accommodating a pin is provided on the pin fixing fastener; a square slot for accommodating a support column is provided on the support column fixing fastener; and a gap between the pin fixing fastener and the support column fixing fastener is used for accommodating the spring.

Further, a seal ring is provided on the lock hole.

In view of the above technical solutions, in the present disclosure, the electric push rods may be used to drive the preservation container body fixing part and the preservation container body sliding part to move relative to each other, such that the volume of a sealed compartment of the preservation container body increases, the air concentration decreases, the pressure decreases, and vacuuming may be implemented without using a vacuum pump to perform air pumping. The door body sealing assembly is used such that rotation of the rotating shaft rod can drive the cam to rotate. A rotation contour of the cam is used to allow the ejector rod to follow a specific path, and the drawer assembly is tightly locked to the preservation container body. The first sealing strip, the second sealing strip, and the sealing part are provided, thereby defining the sealing effect of the entire device. The present disclosure has a simple structure and may be generally noise free.

Figure 1:
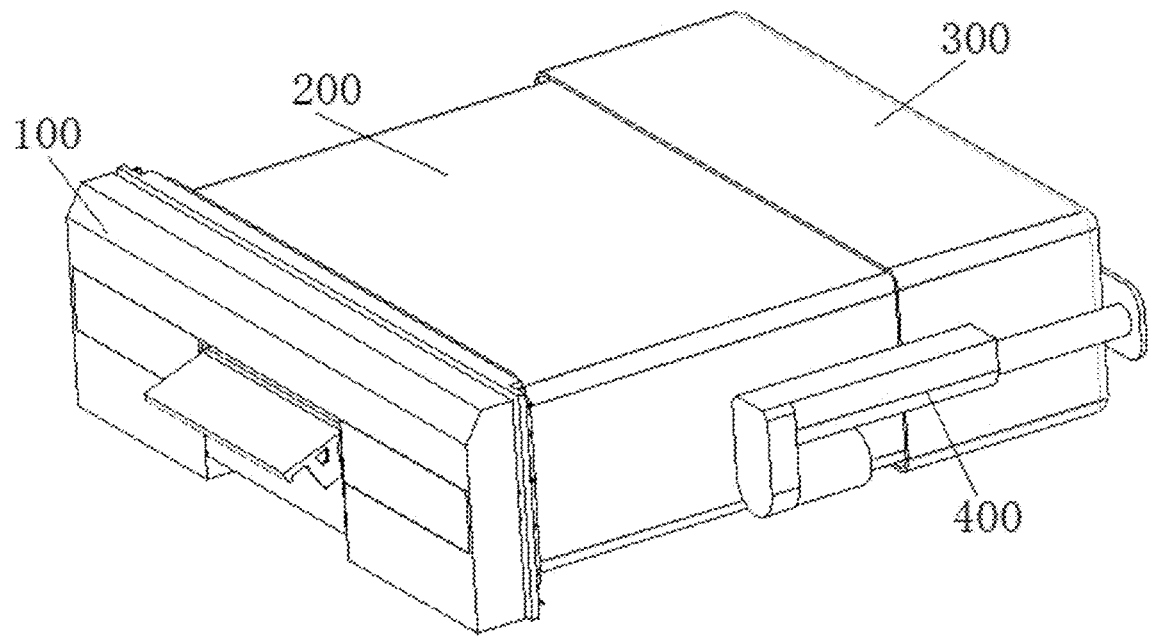
FIG. 1 is a first schematic structural view of the present disclosure.
Figure 2:
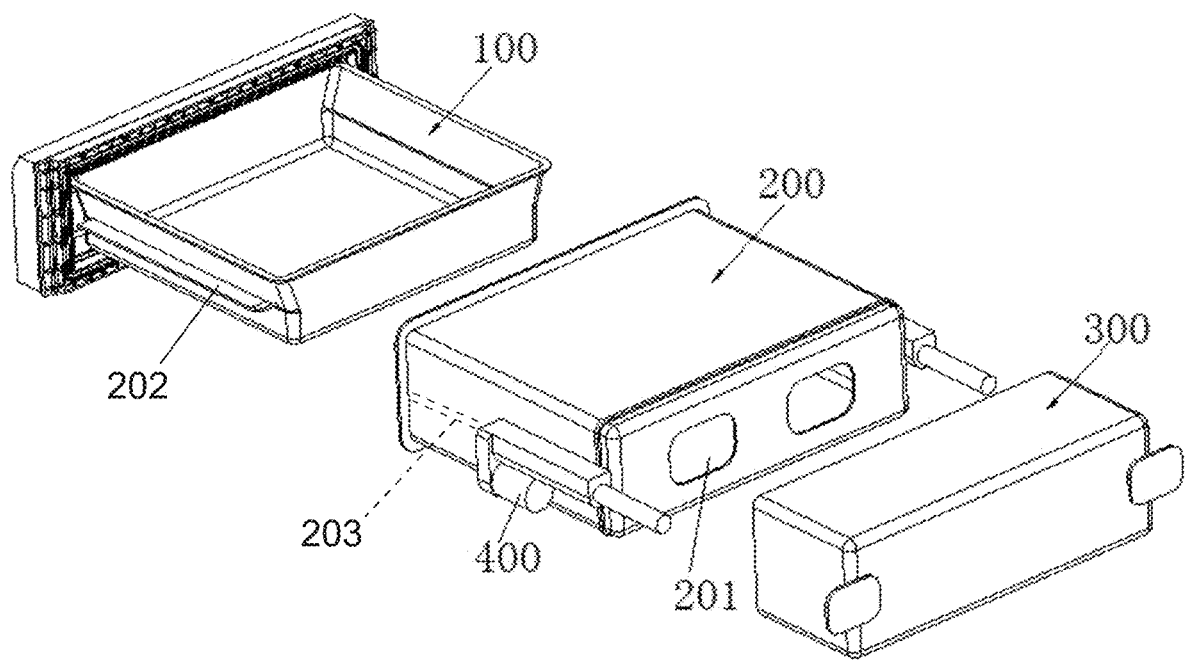
FIG. 2 is a second schematic structural view of the present disclosure.
Figure 3:
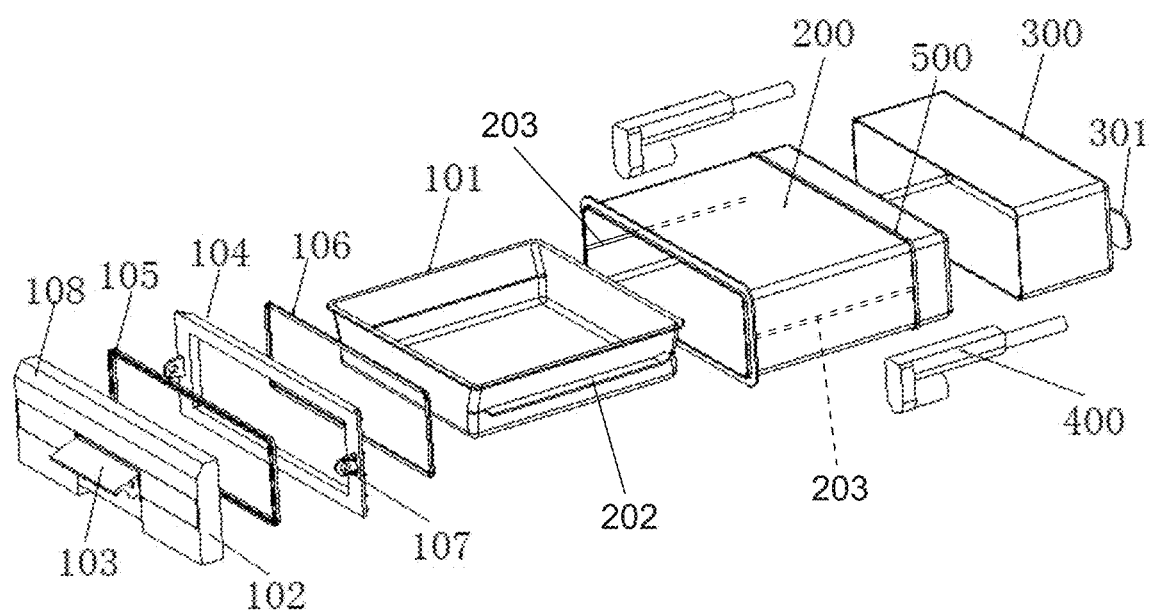
FIG. 3 is an exploded schematic structural view of the present disclosure.
Figure 4:
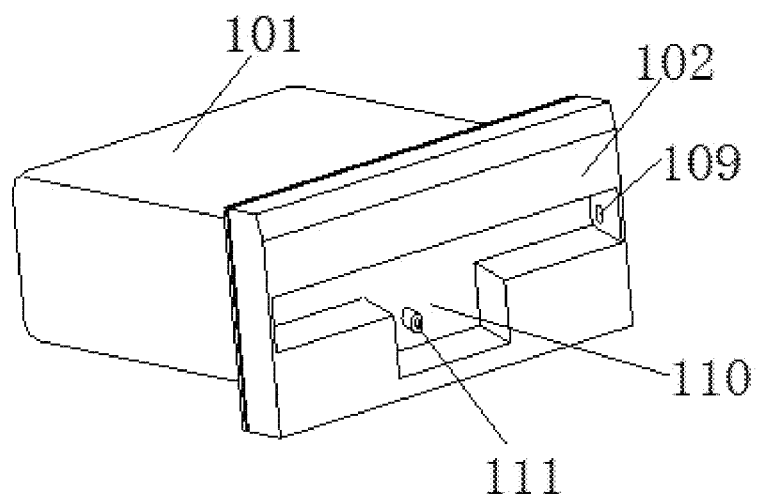
FIG. 4 is a schematic structural view of a drawer assembly.
Figure 5:
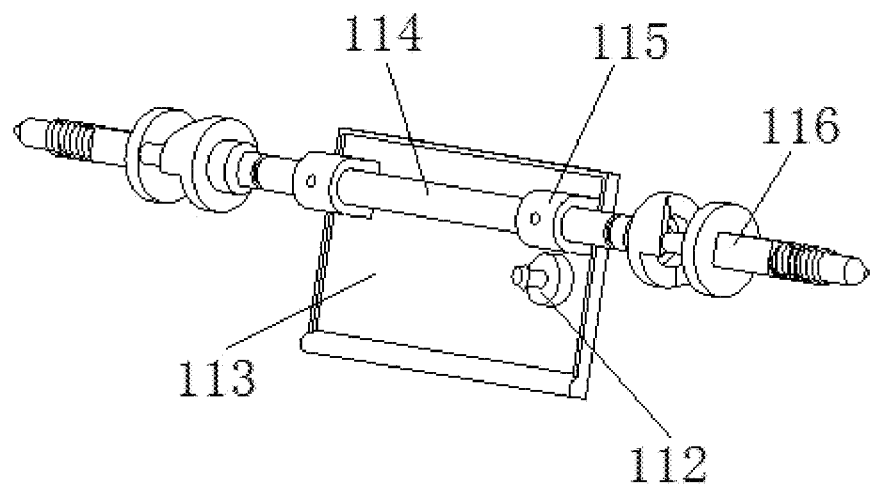
FIG. 5 is a schematic structural view of a handle assembly.
Figure 6:
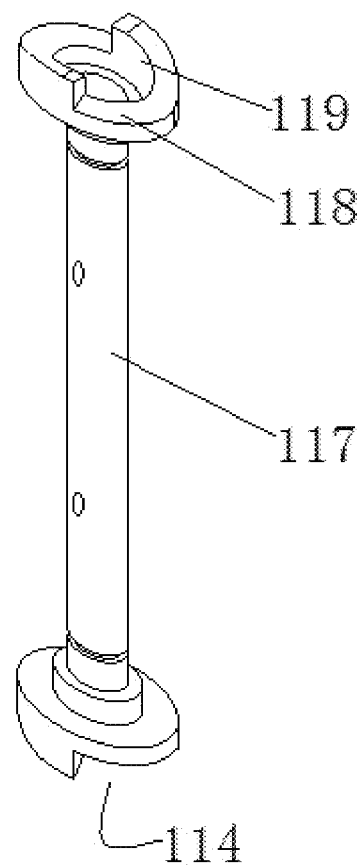
FIG. 6 is a schematic structural view of a rotating shaft rod.
Figure 7:
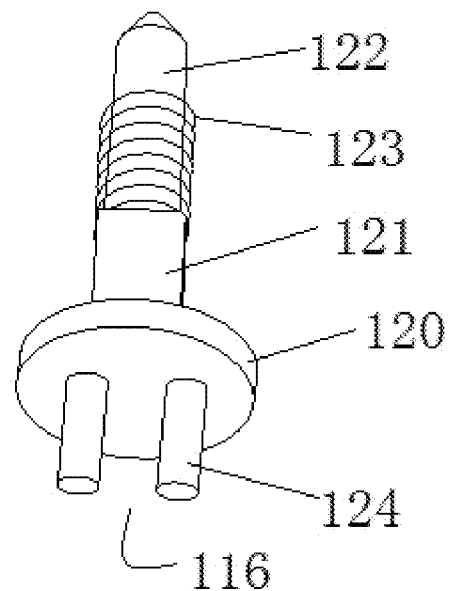
FIG. 7 is a schematic structural view of an ejector rod.

100: drawer assembly; 101: drawer; 102: drawer panel; 103: handle assembly; 104: panel fixing frame; 105: first sealing strip; 106: second sealing strip; 107: lock ring; 108: decorative plate; 109: lock hole; 110: mounting slot; 111: vent hole; 112: rubber plug; 113: handle; 114: rotating shaft rod; 115: fixing fastener; 116: ejector rod; 117: shaft rod; 118: shaft rod disc; 119: cam; 120: support plate; 121: support column; 122: pin; 123: spring; 124: column; 125: first fixing fastener; 126: second fixing fastener; 127: pin fixing fastener; 128: support column fixing fastener; 129: connecting plate; 130: arc-shaped slot; 131: square slot; 200: preservation container body fixing part; 300: preservation container body moving part; 301: fixing plate; 400: electric push rod; 500: sealing portion.

DETAILED DESCRIPTION

The present disclosure is further described below with reference to the accompanying drawings:

As shown in FIGS. 1-4, a vacuum preservation device comprises a drawer assembly 100 and a preservation container body. A sealed compartment is formed between the drawer assembly 100 and the preservation container body by means of a first sealing strip 105, a second sealing strip 106, and a sealing part 500. An electric push rod 400 extends forwards or retracts backward to increase or decrease the volume of the sealed compartment such that a vacuum compartment is formed.

Specifically, the drawer assembly 100 comprises a drawer 101, a drawer panel 102 disposed at a front end of the drawer 101, and a handle assembly 103 mounted on the drawer panel 102. A mounting slot 110 is provided on the drawer panel 102, and a vent hole 111 is provided in the mounting slot 110. The handle assembly 103 comprises a door body sealing assembly mounted in the mounting slot 110 and a handle 113 connected to the door body sealing assembly. An inner sidewall of the handle 113 is provided with a rubber plug 112 adapted to the vent hole 111.

The preservation container body comprises a preservation container body fixing part 200 and a preservation container body sliding part 300 connected to each other by electric push rods 400, and a sealing part 500 that is either disposed between the preservation container body fixing part 200 and the preservation container body sliding part 300 or wraps around outer sides of the preservation container body fixing part 200 and the preservation container body sliding part 300. A front end of the preservation container body fixing part 200 is provided with an opening for the drawer 101 to enter and exit, and the preservation container body fixing part 200 slidably engages with the drawer 101. A front end of the preservation container body sliding part 300 is provided with an opening for the preservation container body fixing part 200 to enter and exit. A plurality of through holes are provided on a rear wall of the preservation container body fixing part 200. The rear wall of the preservation container body fixing part 200 is provided with through holes 201, rather than the rear wall being directly removed, such that the preservation container body fixing part 200 has higher structural strength and can withstand greater external air pressure without deforming. The preservation container body is a sealed container body, and a sealing material is used between the preservation container body fixing part 200 and the preservation container body sliding part 300 so as to achieve sealing. The sealing material can be a bellows wrapping around outer sides of the preservation container body fixing part 200 and the preservation container body sliding part 300, or a sealing strip disposed between the preservation container body fixing part 200 and the preservation container body sliding part 300. The preservation container body is formed by bending and welding a sheet metal.

Further, the electric push rods 400 are two electric push rods 400 symmetrically disposed on a left side and a right side of the preservation container body fixing part 200. A left side and a right side of a rear wall of the preservation container body sliding part 300 are respectively provided with fixing plates 301 extending outwards, and a rear end of the electric push rod 400 is connected to the fixing plate 301. The electric push rod 400 pushes the preservation container body sliding part 300 to slide backward, such that the volume of the preservation container body increases, and the air concentration in the sealed compartment decreases, thereby enabling a vacuum state.

Further, the drawer panel 102 is mounted at the front end of the drawer 101 via a panel fixing frame 104. The first sealing strip 105 is provided between the drawer panel 102 and the panel fixing frame 104, and the second sealing strip 106 is provided between the panel fixing frame 104 and a front sidewall of the drawer 101. When the drawer 101 is closed, the first sealing strip 105 and the second sealing strip 106 are sealingly bonded with the preservation container body, such that the internal air is isolated from external air. Thus, the sealing between the flat contact surfaces of the drawer panel 102 and the preservation container body may be generally airtight.

Further, a left side and a right side of the drawer 101 are respectively provided with sliders, 202, and inner walls of a left side and a right side of the preservation container body fixing part 200 are respectively provided with guide rails 203 slidably engaging with the sliders 202.

Further, the sealing part 500 is a bellows or a sealing strip.

Figure 10:
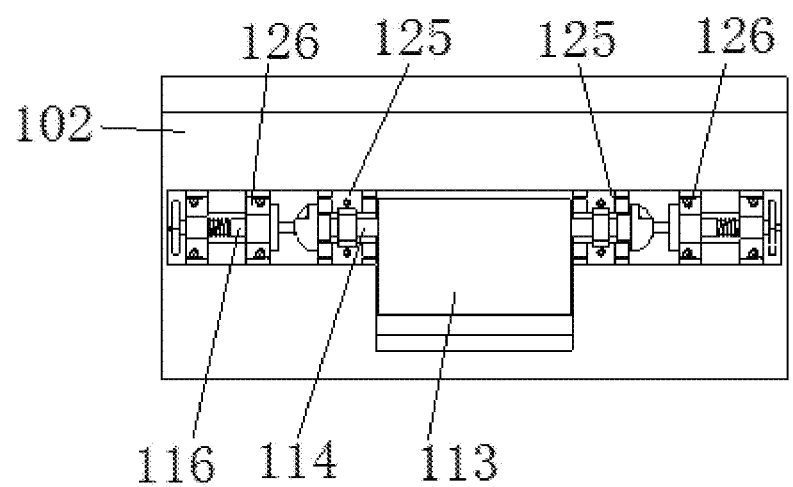
FIG. 10 is a schematic view of an assembly structure of a handle assembly on a drawer panel.

Further, each of a left side and a right side of the panel fixing frame 104 is provided with a lock ring 107. The mounting slot 110 may be a T-shaped slot disposed on an outer side surface of the drawer panel 102, and sidewalls of two ends of a horizontal slot body of the T-shaped slot are provided with lock holes 109 matching the lock rings 107. As shown in FIG. 10, a first fixing fastener 125 and a second fixing fastener 126 are mounted in the horizontal slot body of the T-shaped slot. A seal ring is provided on the lock hole 109.

As shown in FIGS. 5-9, the door body sealing assembly comprises a rotating shaft rod 114 movably connected to the first fixing fastener 125 and two ejector rods 116 respectively disposed at two ends of the rotating shaft rod 114; the handle 113 is fixedly mounted on a middle section of the rotating shaft rod 114 via a fixing fastener 115, and the ejector rod 116 is movably connected to the second fixing fastener 126. The rotating shaft rod 114 comprises a shaft rod 117, two shaft rod discs 118 respectively disposed at two ends of the shaft rod 117, and two cams 119 respectively perpendicularly connected to outer sidewalls of the two shaft rod discs 118. The top of the cam 119 is a horizontal platform, wherein a first side edge of the cam 119 is perpendicular to the shaft rod disc 118, and a second side edge extends obliquely downwards from the top of the cam 119 to the shaft rod disc 118. The ejector rod 116 comprises a support plate 120, a support column 121 and a pin 122 connected in sequence to an outer sidewall of the support plate 120, a spring 123, sleeved on an outer side of the pin 122, has an inner end portion connected to the support column 121, and two columns 124 disposed on an inner sidewall of the support plate 120. A distance between the two columns 124 is equal to a distance between the horizontal platforms at the top of the two cams 119.

When the drawer 101 is closed, the rotating shaft rod 114 drives the cam 119 to rotate via closing the handle 113, which makes a follower ejector rod to move in accordance with the change of a cam contour, which in turn enables the door body sealing assembly to be tightly locked with the preservation container body, such that a sealed space is formed. The electric push rod 400 pushes the preservation container body sliding part 300 to move backwards to enable the vacuuming in the sealed compartment defined by the drawer 101, the preservation container body sliding part 300, and the preservation container body fixing part 200. When the drawer 101 is opened, the handle 113 is rotated, and the rotating shaft rod 114 drives the cam 119 to rotate, so that the follower ejector rod returns, under the action of the spring, to the shaft rod disc 118 of the rotating shaft rod 114. The door body sealing assembly and the container body are then in an opened state, and the vent hole 111 of the drawer panel 102 is simultaneously opened. Thus, the internal air pressure is gradually equalized with the external air pressure, and the drawer 101 may then be opened. Providing the door body sealing assembly may ensure the sealing effect, such that the present application may easily implement production. The door body sealing assembly uses the handle 113 to drive, by means of concentric axial rotation, the cam 119 to rotate and uses a rotation contour of the cam 119 to allow the ejector rod 116 to follow a specific path, such that the drawer assembly 100 is tightly locked to the preservation container body. The door body sealing assembly has a simple structure and is easy to operate. Such a design can effectively solve the technical problem in which a door of a vacuum container body is difficult to open.

Figure 8:
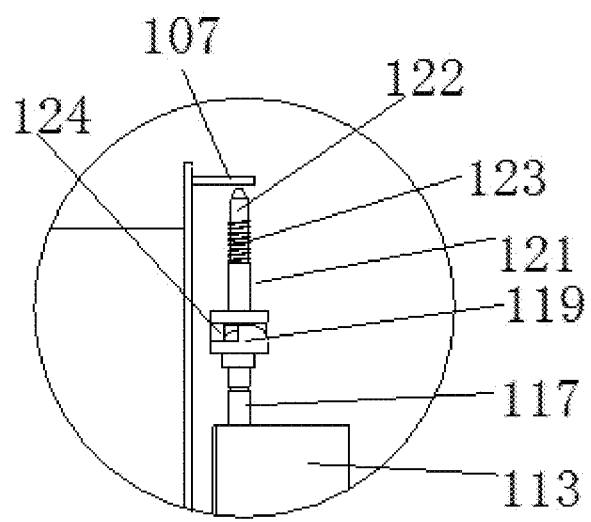
FIG. 8 is a schematic structural view of a preservation container body in an unlocked state.
Figure 9:
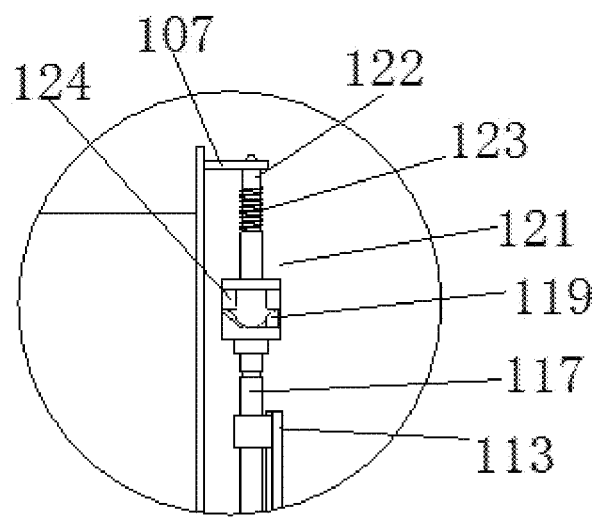
FIG. 9 is a schematic structural view of a preservation container body in a closed state.

FIG. 9 is a schematic structural view of the drawer assembly 100 and the preservation container body in a closed state. When the handle 113 is placed in the T-shaped slot, the two columns of the ejector rod 116 are placed on the two cams 119 of the rotating shaft rod 114, such that the pin 122 is pushed into the lock ring 107. A sidewall of the spring adjacent to a circular slot fixing fastener 115 of the second fixing fastener 126 is in a compressed state, and the rubber plug 112 of the handle 113 is inserted into the vent hole 111. FIG. 8 shows an unlocked state of the container body. When the handle 113 is lifted up, the spring force provided by the spring, restoring from the compressed state, slides the two columns of the ejector rods 116 downwards along a slope of the cam 119. The two columns stop on the shaft rod disc 118 of the rotating shaft rod 114, such that the two ejector rods 116 retract towards the rotating shaft rod 114 and drive the pin 122 to move out of the lock ring 107 so as to unlock the drawer assembly 100 and the preservation container body from the drawer panel 102. At the same time, the rubber plug 112 of the handle 113 is moved out of the vent hole 111. The internal air pressure is thus gradually equalized with the external air pressure, and the drawer 101 may then be opened.

Figure 11:
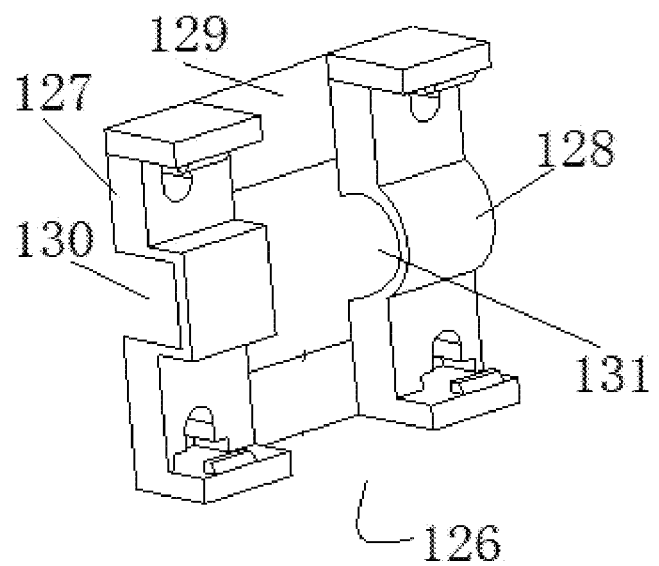
FIG. 11 is a schematic structural view of a second fixing fastener.

Further, the first fixing fastener 125 comprises a first fixing fastener 125 main body mounted in the T-shaped slot, a rotating slot provided on the first fixing fastener 125 main body, and a shaft rod 117 retaining portion disposed on an outer sidewall of the rotating slot. The shaft rod 117 rotatably engages with the rotating slot. As shown in FIG. 11, the second fixing fastener 126 comprises a pin fixing fastener 127 and a support column fixing fastener 128 sequentially provided thereon and two connecting plates 129 respectively connected to upper ends and lower ends of the pin fixing fastener 127 and the support column fixing fastener 128. An arc-shaped slot 130 for accommodating the pin 122 is provided on the pin fixing fastener 127. A square slot 131 for accommodating the support column is provided on the support column fixing fastener 128, and a gap between the pin fixing fastener 127 and the support column fixing fastener 128 is used for accommodating the spring.

An operating process of the present disclosure is as follows:

When the drawer 101 and the handle assembly 103 are in a closed state, the drawer 101 and the handle assembly 103 are tightly locked to the preservation container body fixing part 200, and a preservation device remains in a sealed state. The electric push rod 400 device is activated, and the electric push rod 400 pushes the preservation container body sliding part 300 to move forward, such that the internal volume of the preservation container body increases and the air density in the preservation container body decreases due to unchanged air mass in the preservation container body, thereby achieving a vacuum state. When the drawer 101 and the handle assembly 103 are in an opened state, the drawer 101 and the handle assembly 103 are unlocked from the preservation container body fixing part 200, and the preservation device remains in an opened state. The electric push rod 400 is activated, and the electric push rod 400 pulls the preservation container body sliding part 300 to retract backward, such that the internal volume of the preservation container body is restored. The air pressure is equalized, and the drawer assembly 100 can then be opened.

According to another aspect of the present disclosure, a vacuum preservation device includes a drawer that has a drawer panel disposed at a front end of the drawer, and a handle assembly that is coupled to the drawer panel. The handle assembly includes a door body sealing assembly and a handle. A preservation container body has a preservation container body fixing part and a preservation container body sliding part. An electric push rod is coupled to the preservation container body. The electric push rod is coupled to the preservation container body fixing part and the preservation container body sliding part.

According to yet another aspect of the present disclosure, a vacuum preservation assembly includes a mounting slot that defines a drawer panel. The mounting slot defines a vent hole. A plug is coupled to a handle and is received by the vent hole.

According to still another aspect of the present disclosure, a vacuum preservation assembly includes a door body sealing assembly that is disposed within a mounting slot. The door body sealing assembly is coupled to a handle.

According to another aspect of the present disclosure, a vacuum preservation assembly includes a sealing part that is positioned between the sealing part and a preservation container body fixing part of a preservation container body.

According to yet another aspect of the present disclosure, a preservation container body fixing part includes a rear wall that defines a plurality of holes.

According to still another aspect of the present disclosure, a sliding part defines an opening through which a rear wall of a preservation container body fixing part slidably engages with the sliding part.

According to yet another aspect of the present disclosure, a sealing part is disposed around a rear wall of a preservation container body fixing part. A preservation container body sliding part is positioned around the sealing part.

According to another aspect of the present disclosure, a drawer slidably engages a preservation container body fixing part of a preservation container body through an opening that is defined by the preservation container body fixing part.

According to still another aspect of the present disclosure, a fixing plate is coupled to a rear wall of a preservation container body sliding part of a preservation container body.

According to yet another aspect of the present disclosure, a rear end of an electric push rod is coupled to a fixing plate.

The embodiments described above are implementations of the present disclosure, but are not to limit the scope of the present disclosure. Without departing from the design of the present disclosure, those skilled in the art may make various variations and improvements to the technical solutions of the present disclosure, and such improvements or variations shall all fall within the protection scope as defined by the claims of the present disclosure.

The invention claimed is:

1. A vacuum preservation device, comprising:
   a drawer assembly, wherein the drawer assembly comprises:
   a drawer;
   a drawer panel disposed at a front end of the drawer;
   a mounting slot is provided on the drawer panel, and a vent hole is provided in the mounting slot; and
   a handle assembly mounted on the drawer panel, wherein the handle assembly includes a door body sealing assembly mounted in the mounting slot and a handle connected to the door body sealing assembly, wherein an inner sidewall of the handle is provided with a rubber plug adapted to the vent hole; and
   a preservation container body, wherein the preservation container body comprises:
   a preservation container body fixing part having a plurality of through holes defined by a rear wall of the preservation container body fixing part, wherein a front end of the preservation container body fixing part is provided with an opening for the drawer to enter and exit, and the preservation container body fixing part slidably engages with the drawer;
   a preservation container body sliding part connected to the preservation container body fixing part by electric push rods, wherein a front end of the preservation container body sliding part is provided with an opening for the preservation container body fixing part to enter and exit; and
   a sealing part is either disposed between the preservation container body fixing part and the preservation container body sliding part or wraps around outer sides of both of the preservation container body fixing part and the preservation container body sliding part.

2. The vacuum preservation device according to claim 1, wherein the electric push rods are two electric push rods symmetrically disposed on a left side and a right side of the preservation container body fixing part, and further wherein a left side and a right side of a rear wall of the preservation container body sliding part are respectively provided with fixing plates extending outwards, wherein a rear end of the electric push rod is connected to the fixing plate.

3. The vacuum preservation device according to claim 1, wherein the drawer panel is mounted at the front end of the drawer via a panel fixing frame, and wherein a first sealing strip is provided between the drawer panel and the panel fixing frame, and further wherein a second sealing strip is provided between the panel fixing frame and a front sidewall of the drawer.

4. The vacuum preservation device according to claim 1, wherein a left side and a right side of the drawer are respectively provided with sliders, and wherein inner walls of a left side and a right side of the preservation container body fixing part are respectively provided with guide rails slidably engaging with the sliders.

5. The vacuum preservation device according to claim 1, wherein the sealing part is a bellows or a sealing strip.

6. The vacuum preservation device according to claim 1, wherein an outer side of the drawer panel is provided with a decorative plate.

7. The vacuum preservation device according to claim 3, wherein each of a left side and a right side of the panel fixing frame is provided with a lock ring, and wherein the mounting slot is a T-shaped slot disposed on an outer side surface of the drawer panel, wherein sidewalls of two ends of a horizontal slot body of the T-shaped slot are provided with lock holes matching the lock rings, and further wherein a first fixing fastener and a second fixing fastener are mounted in the horizontal slot body of the T-shaped slot.

8. The vacuum preservation device according to claim 7, wherein the door body sealing assembly comprises:
   a rotating shaft rod movably connected to the first fixing fastener, wherein the handle is fixedly mounted on a middle section of the rotating shaft rod, and further wherein the rotating shaft rod comprises:

a shaft rod;

two shaft rod discs respectively disposed at two ends of the shaft rod; and two cams respectively perpendicularly connected to outer sidewalls of the two shaft rod discs, wherein a top of each cam defines a horizontal platform, a first side edge of each cam is perpendicular to each of the shaft rod discs, and a second side edge of each cam extends obliquely downward from the top of each cam to one of the shaft rod discs; and two ejector rods respectively disposed at two ends of the rotating shaft rod, wherein each of the ejector rods is movably connected to the second fixing fastener, and further wherein each of the ejector rods comprises:

a support plate;

a support column; and a pin connected in sequence to an outer sidewall of the support plate, a spring sleeved on an outer side of the pin that has an inner end portion connected to the support column, and two columns disposed on an inner sidewall of the support plate, wherein a distance between the two columns is equal to a distance between the horizontal platform at the top of each of the two cams.

9. The vacuum preservation device according to claim 7, wherein the first fixing fastener comprises:

a first fixing fastener main body mounted in the T-shaped slot;

a rotating slot provided on the first fixing fastener main body; and a shaft rod retaining portion disposed on an outer sidewall of the rotating slot, wherein the shaft rod rotatably engages with the rotating slot;

the second fixing fastener comprises:

a pin fixing fastener;

a support column fixing fastener sequentially provided thereon; and two connecting plates respectively connected to upper ends and lower ends of the pin fixing fastener and the support column fixing fastener;

an arc-shaped slot for accommodating a pin is provided on the pin fixing fastener;

a square slot for accommodating a support column is provided on the support column fixing fastener; and a gap between the pin fixing fastener and the support column fixing fastener is used for accommodating the spring.

10. The vacuum preservation device according to claim 7, wherein a seal ring is provided on each of the lock holes.

11. A vacuum preservation device, comprising:

a drawer having a drawer panel disposed at a front end of the drawer;

a handle assembly coupled to the drawer panel, wherein the handle assembly includes a door body sealing assembly and a handle;

a preservation container body having a fixing part and a sliding part; and an electric push rod coupled to the preservation container body, wherein the electric push rod couples the sliding part to the fixing part.

12. The vacuum preservation assembly of claim 11, further including:

a mounting slot defined by the drawer panel, wherein the mounting slot defines a vent hole; and a plug coupled to the handle, wherein the plug is received by the vent hole.

13. The vacuum preservation assembly of claim 12, wherein the door body sealing assembly is disposed within the mounting slot, and further wherein the door body sealing assembly is coupled to the handle.

14. The vacuum preservation assembly of claim 11, wherein a sealing part is positioned between the sliding part and the fixing part of the preservation container body.

15. The vacuum preservation assembly of claim 11, wherein the fixing part includes a rear wall that defines a plurality of through holes.

16. The vacuum preservation assembly of claim 15, wherein the sliding part defines an opening through which the rear wall of the fixing part slidably engages with the sliding part.

17. The vacuum preservation assembly of claim 15, wherein a sealing part is disposed around the rear wall of the fixing part, and further wherein the sliding part is positioned around the sealing part.

18. The vacuum preservation assembly of claim 11, wherein the drawer slidably engages the fixing part of the preservation container body through an opening defined by the fixing part.

19. The vacuum preservation assembly of claim 11, wherein a fixing plate is coupled to a rear wall of the sliding part of the preservation container body.

20. The vacuum preservation assembly of claim 19, wherein a rear end of the electric push rod is coupled to the fixing plate.

* * * * *